(12) United States Patent
Takeuchi et al.

(10) Patent No.: US 8,831,398 B2
(45) Date of Patent: Sep. 9, 2014

(54) IN-VEHICLE REPRODUCING SYSTEM AND DISPLAY DEVICE

(71) Applicant: Sony Corporation, Tokyo (JP)

(72) Inventors: Naoki Takeuchi, Tokyo (JP); Satoru Higashiyama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/682,951

(22) Filed: Nov. 21, 2012

(65) Prior Publication Data

US 2013/0136414 A1   May 30, 2013

(30) Foreign Application Priority Data

Nov. 28, 2011   (JP) .................................. 2011-258918

(51) Int. Cl.
| | |
|---|---|
| *H04N 5/932* | (2006.01) |
| *H04N 9/87* | (2006.01) |
| *H04N 21/41* | (2011.01) |
| *H04N 21/414* | (2011.01) |
| *H04N 21/4147* | (2011.01) |
| *H04N 21/4363* | (2011.01) |
| *H04N 21/432* | (2011.01) |

(52) U.S. Cl.
CPC ............. *H04N 9/87* (2013.01); *H04N 21/4122* (2013.01); *H04N 21/41422* (2013.01); *H04N 21/4147* (2013.01); *H04N 21/43637* (2013.01); *H04N 21/4325* (2013.01)
USPC .......................................... 386/219; 386/230

(58) Field of Classification Search
None
See application file for complete search history.

(56) References Cited

U.S. PATENT DOCUMENTS

| 2009/0007192 A1* | 1/2009 | Singh .............................. 725/75 |
| 2010/0182207 A1* | 7/2010 | Miyata et al. ................. 343/702 |
| 2011/0178616 A1* | 7/2011 | Janik et al. ..................... 700/94 |
| 2012/0331511 A1* | 12/2012 | Chen .............................. 725/75 |

FOREIGN PATENT DOCUMENTS

| JP | 2003-191799 | 7/2003 |
| JP | 2011-34493 | 2/2011 |

\* cited by examiner

*Primary Examiner* — William C Vaughn, Jr.
*Assistant Examiner* — Eileen Adams
(74) *Attorney, Agent, or Firm* — Oblon, Spivak, McClelland, Maier & Neustadt, L.L.P.

(57) ABSTRACT

Disclosed herein is an in-vehicle reproducing system, including: a reproducing device; and a display device detachably mounted to the reproducing device, wherein the reproducing device is fixed to a vehicle and includes a reproducing portion obtaining at least a video signal from an attachable storage medium, a manipulation portion carrying out control for reproduction from the attachable storage medium, a first wireless communication portion transmitting the video signal to the display device, and an electric power transmitting portion transmitting an electric power to the display device through non-contact electric power transmission, and the display device includes an electric power receiving portion receiving the electric power transmitted thereto from the reproducing device through the non-contact electric power transmission, a second wireless communication portion receiving the video signal from the reproducing device, and a display portion displaying thereon an image based on the video signal received in the second wireless communication portion.

6 Claims, 4 Drawing Sheets

IN-VEHICLE REPRODUCING SYSTEM AND DISPLAY DEVICE

BACKGROUND

The present disclosure relates to an in-vehicle reproducing system composed of a display device which is capable of displaying thereon an image, and an in-vehicle reproducing device which is capable of transmitting an electric power, a video signal, and the like to the display device in a wireless manner, and the display device included in the same.

In recent years, with the aim of antitheft or the like of an in-vehicle electronic apparatus such as an in-vehicle audio system or an in-vehicle navigation system, an in-vehicle reproducing system has been proposed in which a display device (display panel) is detachably mounted to a main body of the in-vehicle electronic apparatus. In the case where such an in-vehicle reproducing system is used, a user can take the display device out of a vehicle when he/she goes out of the vehicle. In the in-vehicle reproducing system having such a construction, heretofore, the in-vehicle reproducing device and the display device are mechanically and electrically connected to each other through connectors which are mounted to the in-vehicle reproducing device and the display device, respectively. Also, a video signal and an audio signal, and the electric power, and the like are supplied from the in-vehicle reproducing device to the display device through the connector.

The in-vehicle reproducing system as described above, for example, is disclosed in Japanese Patent Laid-Open No. 2009-280113.

SUMMARY

However, in the case where the in-vehicle reproducing device and the display device are connected to each other by providing the connectors in the manner as described above, the display device is hard to carry after the display device is detached from the in-vehicle reproducing device because the display device is thick and a weight thereof is large. In addition, in the case where the display device is detached from the in-vehicle reproducing device, since the connection between the display device and the in-vehicle reproducing device is interrupted, it may be impossible to cause the video source reproduced by the in-vehicle reproducing device to be displayed on the display device. For this reason, when an image is desired to be viewed in a rear seat, a cable needs to be wired to the rear seat, thereby installing a display device for the rear seat similarly to the case of the existing audio system or navigation system. In this case, the disfigurement of the in-vehicle reproducing system is caused, and it is necessary to purchase an additional display device. This is not preferable. In addition thereto, in connecting the additional display device, the user needs to carry out a complicated work such as an installation work.

The present disclosure has been made in order to solve the problems described above, and it is therefore desirable to provide an in-vehicle reproducing system in which a display device can be detached from a reproducing device, and even when the display device is detached from the reproducing device, an image, from a recording medium, which is reproduced in the reproducing device can be displayed on the display device, and the display device included in the same.

In order to attain the desire described above, according to an embodiment of the present disclosure, there is provided an in-vehicle reproducing system including: a reproducing device; and a display device detachably mounted to the reproducing device. In the in-vehicle reproducing system, the reproducing device is fixed to a vehicle and includes:

a reproducing portion obtaining at least a video signal from an attachable storage medium;

a manipulation portion carrying out control for reproduction from the attachable storage medium;

a first wireless communication portion transmitting the video signal to the display device; and an electric power transmitting portion transmitting an electric power to the display device through non-contact electric power transmission. In the in-vehicle reproducing system, the display device includes:

an electric power receiving portion receiving the electric power transmitted thereto from the reproducing device through the non-contact electric power transmission;

a second wireless communication portion receiving the video signal from the reproducing device; and a display portion displaying thereon an image based on the video signal received in the second wireless communication portion.

According to another embodiment of the present disclosure, there is provided a display device including:

an electric power receiving portion receiving an electric power transmitted thereto from a reproducing device fixed to a vehicle through non-contact electric power transmission;

a wireless communication portion receiving a video signal from the reproducing device; and a display portion displaying thereon an image based on the video signal received in the wireless communication portion.

The in-vehicle reproducing system according to the embodiment of the present disclosure can transmit the image, from the storage medium, which is reproduced in the reproducing device to the display device which is detachably mounted to the reproducing device through the wireless communication portion, and can display the image on the display device. The electric power is transmitted from the reproducing device to the display device through the non-contact electric power transmission. As a result, the electric power and the reproduced signal can be transmitted from the reproducing device to the display device without requiring the connectors or the like.

As set forth hereinafter, according to the present disclosure, even when the display device is detached from the reproducing device, the display device can be caused to display thereon the image. In addition, the connectors through which the reproducing device and the display device are connected to each other for the purpose of carrying out the supply of the electric power, and the transmission of the reproduced signal become unnecessary, it is possible to realize the thinning and the weight saving of the display device.

DETAILED DESCRIPTION OF THE PREFERRED EMBODIMENTS

Embodiments of the present disclosure will be described in detail hereinafter with reference to the accompanying drawings.

1. Construction and Configuration of In-vehicle Reproducing System

Figure 1:
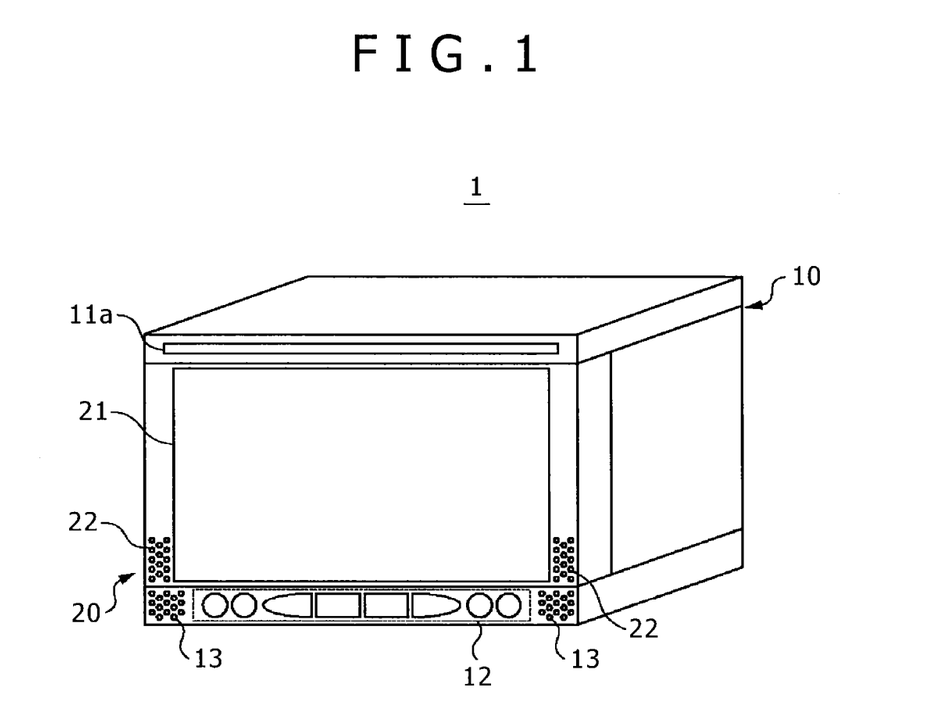
FIG. 1 is an exterior appearance view showing a construction of an in-vehicle reproducing system according to a first embodiment of the present disclosure.
Figure 2A:
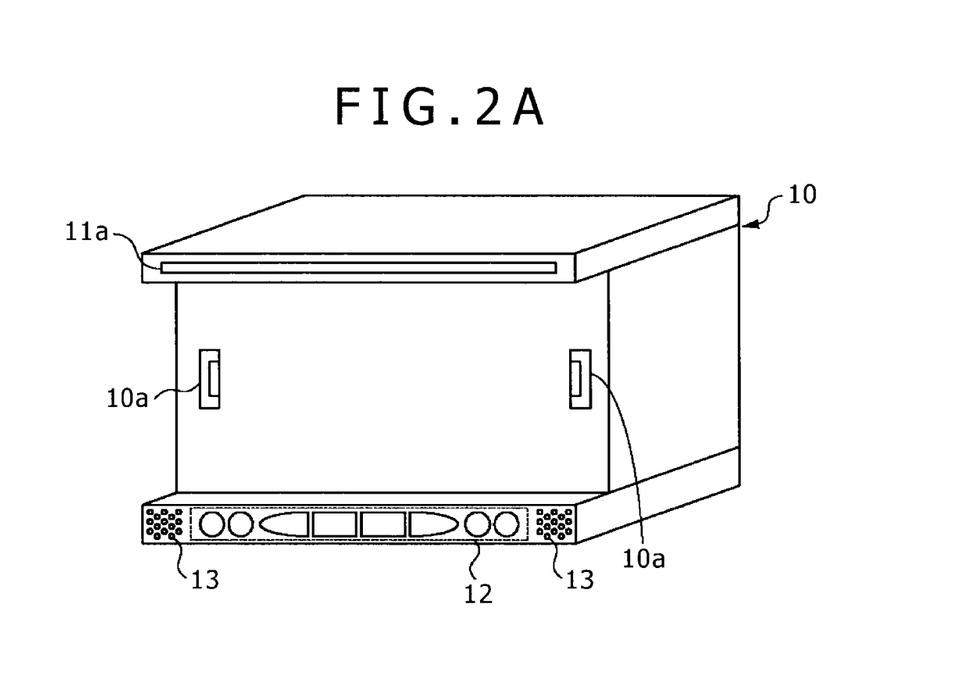
FIGS. 2A and 2B are respectively exterior appearance views of an in-vehicle reproducing device and a display device composing the in-vehicle reproducing system according to the first embodiment of the present disclosure.
Figure 2B:
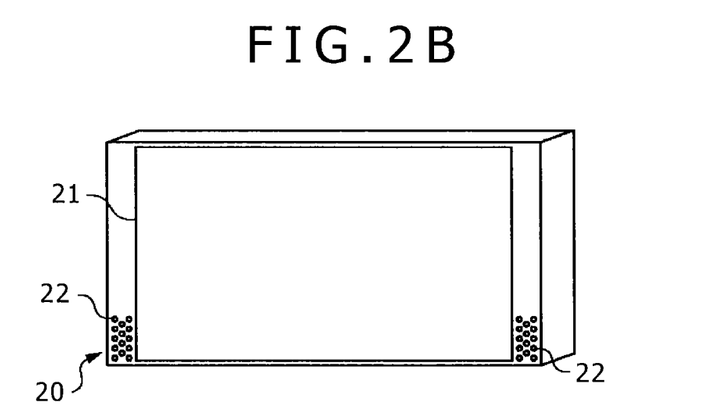

FIG. 1 is an exterior appearance view showing a construction of an in-vehicle reproducing system 1 in which a display device 20 is fitted into an in-vehicle reproducing device 10 as a reproducing device in a first embodiment of the present disclosure. FIG. 2A is an exterior appearance view of the in-vehicle reproducing device 10 from which the display device 20 is detached. Also, FIG. 2B is an exterior appearance view of the display device 20 in a state of being detached from the in-vehicle reproducing device 10. The display device 20 includes a display portion 21 and speakers 22. In a state in which a user can visually recognize the display portion 21, the display device 20 can be attached to the in-vehicle reproducing device 10.

The in-vehicle reproducing device 10, for example, includes a disk inserting portion 11a on a front surface thereof. Thus, the in-vehicle reproducing device 10 adopts a construction such that a disk medium as a storage medium such as a Compact Disc (CD), a Digital Versatile Disk (DVD) or a Blu-ray Disc (registered trademark of the Blu-ray Association) can be inserted into the disk inserting portion 11a. The disk medium which is inserted from the disk inserting portion 11a is accommodated in a disk drive (not shown) provided inside the in-vehicle reproducing device 10 to be subjected to the reproduction. The in-vehicle reproducing device 10, for example, includes speakers 13 on the front surface thereof, and a sound obtained through the reproduction from the disk medium is outputted from the speakers 13.

It is noted that the storage medium subjected to the reproduction is by no means limited to the disk medium, and thus may be a subsidiary storage medium such as Memory Stick (registered trademark of Sony Corporation) or an SD memory vehicled (registered trademark of SD Association), or a portable audio player such as a WARKMAN (registered trademark of Sony Corporation) or an iPod (registered trademark of Apple Inc.). In this case, either an insertion portion or a connection portion substituted for the disk inserting portion 11a is provided so as to correspond to any of those media.

The in-vehicle reproducing device 10, for example, includes a manipulation portion 12 on the front surface thereof. Thus, the user manipulates any portion of the manipulation portion 12, thereby making it possible to control the reproduction or the like of the disk medium accommodated in the disk drive. The manipulation portion 12 may be provided with an eject button or the like which is manipulated when the disk medium is desired to be taken out. In addition, the manipulation portion 12 may also be provided with a detaching button which is manipulated when the display device 20 fitted into the in-vehicle reproducing device 10 is desired to be detached from the in-vehicle reproducing device 10.

The in-vehicle reproducing device 10, for example, includes an engagement portion 10a on a surface which contacts the display device 20 when the display device 20 is fitted into the in-vehicle reproducing device 10. The engagement portion 10a serves to fix the in-vehicle reproducing device 10 and the display device 20 to each other by a mechanical construction thereof. The engagement portion 10a may adopt any type mechanical construction as long as the in-vehicle reproducing device 10 and the display device 20 can be fixed to each other by the mechanical construction concerned. It is noted that the engagement portion 10a in the in-vehicle reproducing device 10 in the first embodiment serves to mechanically connect and fix the in-vehicle reproducing device 10 and the display device 20 to each other, but does not serve to electrically connect the in-vehicle reproducing device 10 and the display device 20 to each other.

The in-vehicle reproducing device 10 is installed in the vehicle to be electrically connected to the vehicle, and receives the electric power supplied thereto, thereby carrying out the reproduction or the like of the disk medium. Also, the in-vehicle reproducing device 10 transmits a reproduced signal (such as an audio signal and a video signal) reproduced from the disk medium to the display device 20 through a wireless communication. In addition, the in-vehicle reproducing device 10 transmits the electric power to the display device 20 through non-contact electric power transmission.

The display device 20 can display an image reproduced from the disk medium in the in-vehicle reproducing device 10 on the display portion 21, and can output a sound reproduced from the disk medium from the speakers 22. The display device 20 receives the reproduced signal reproduced from the disk medium from the in-vehicle reproducing device 10 in a wireless manner. In addition, the electric power for the driving of the display device 20 is transmitted from the in-vehicle reproducing device 10 through the non-contact electric power transmission.

Here, a mobile phone, especially, a smartphone with which communication can be made with the in-vehicle reproducing device 10, for example, may be used as the display device 20. In addition, it is more preferable if the mobile phone such as the smartphone has a configuration with which the electric power can be transmitted from the in-vehicle reproducing device 10 through the non-contact electric power transmission. The function for the communication made with the in-vehicle reproducing device 10, and the electric power transmission made through the non-contact electric power transmission either may be built in the mobile phone or may be provided in an accessory device connected to the mobile phone. The accessory device, for example, may be integrated with a case for a mobile phone.

It is noted that although the description has been given with respect to the configuration such that the speakers 13 and the speakers 22 are provided in the in-vehicle reproducing device 10, and the display device 20, respectively, that configuration is merely exemplified as an example. Thus, the speakers 13 and the speakers 22 may not be provided in the in-vehicle reproducing device 10, and the display device 20, respectively. In this case, it is preferable that the in-vehicle reproducing device 10 and a vehicle speaker which is previously provided to the vehicle are connected to each other, and a sound reproduced from the disk medium in the in-vehicle reproducing device 10 is outputted from the vehicle speaker which is previously provided to the vehicle. In addition, a configuration may also be adopted such that the sound is outputted from both of at least one of the speakers 13 of the in-vehicle reproducing device 10 and the speakers 22 of the display device 20, and the vehicle speaker.

Figure 3:
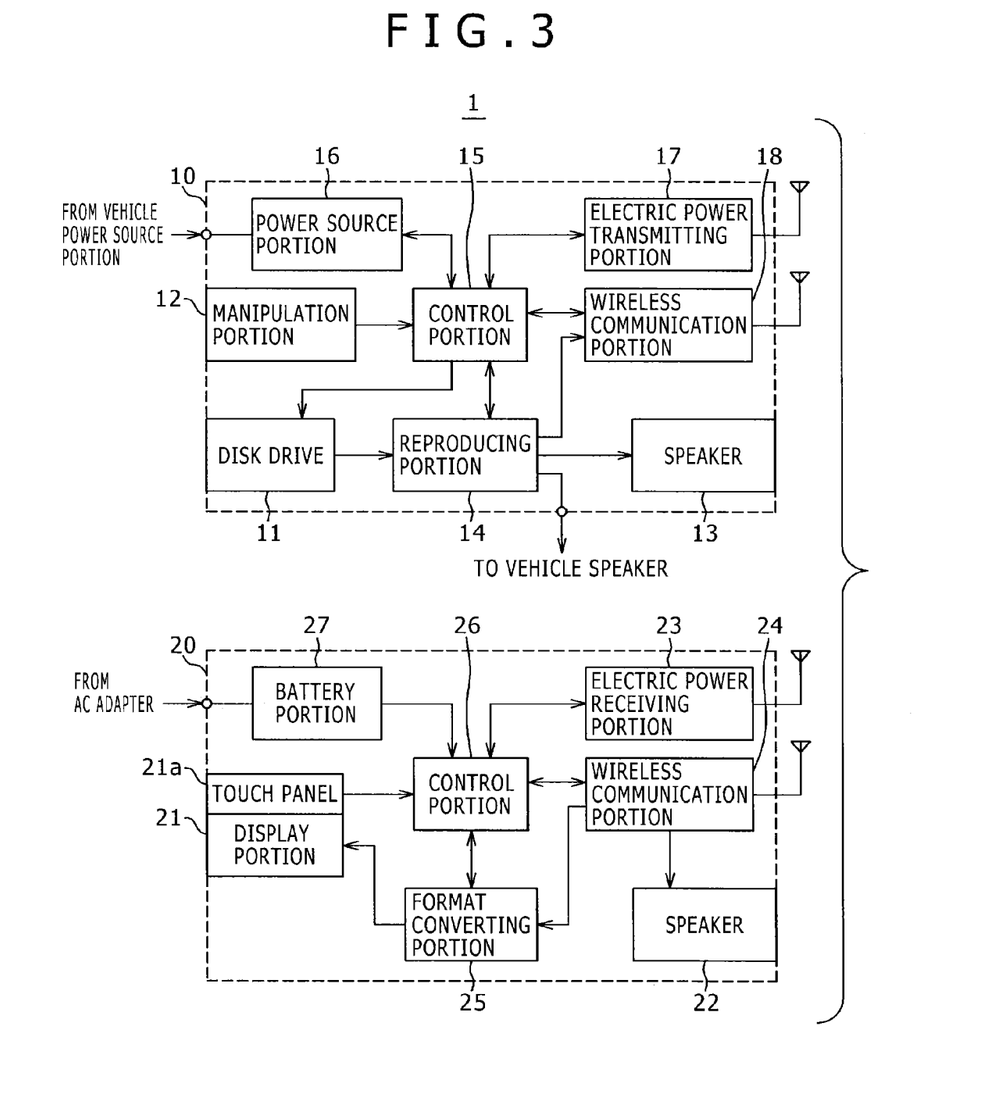
FIG. 3 is a block diagram showing a configuration of the in-vehicle reproducing system according to the first embodiment of the present disclosure.

FIG. 3 is a block diagram showing a configuration of the in-vehicle reproducing system 1 composed of the in-vehicle reproducing device 10 and the display device 20.

The in-vehicle reproducing device 10, for example, is composed of a disk drive 11, a manipulation portion 12, a speaker 13, a reproducing portion 14, a control portion 15, a power source portion 16, an electric power transmitting portion 17, and a wireless communication portion 18.

The disk medium such as the CD, the DVD or the Blu-ray Disc can be inserted into the disk drive 11. The disk drive 11 includes an optical pickup (not shown). The optical pickup is composed of a laser light source, an optical system, and an optical detector. In this case, the laser light source serves to carry out the reproduction from the disk medium. The optical system condenses a laser beam emitted from the laser light source on a recording surface of the disk medium through an objective lens, and takes in a reflected light from the disk medium. Also, the optical detector detects the reflected light taken in by the optical system. In a phase of the reproduction from the disk medium, the laser beam is radiated from the laser light source to the disk medium, and the reflected light from the disk medium is converted into an electrical signal by the optical detector.

The reproducing portion 14, for example, is composed of the optical pickup, and an analog front end (not shown). The analog front end is a signal processing circuit for shaping a signal detected from the disk into a digital signal. In the analog front end, after the laser beam has been radiated to the disk medium, and the reflected light from the disk medium is converted into the electrical signal by the optical detector, the electrical signal is obtained from the optical pickup. A Radio Frequency (RF) signal, a focus error signal, a tracking error signal, and a wobble signal are outputted as reproduced data from the analog front end. Also, after the RF signal has been shaped to remove away high-frequency signal components of a high-frequency signal of the RF signal, predetermined signal processing such as binarization processing is executed, and decode processing for the RF signal is executed, thereby executing error correction processing. As a result, a reproduced signal (audio signal) about a sound or a reproduced signal (audio signal and video signal) about a sound and video are both obtained.

Both of the video signal and the audio signal reproduced from the disk medium in the reproducing portion 14 are sent to the wireless communication portion 18. When the sound is outputted from the speaker 13, the audio signal is sent to the speaker 13 as well. A sound volume and the like are adjusted for the sound in the speaker 13 in accordance with the control made by the control portion 15, and the resulting sound is then outputted from the speaker 13.

The wireless communication portion 18 can make a bidirectional communication with a wireless communication portion 24 of the display device 20. The wireless communication portion 18 includes a wireless modulating portion (not shown) for transmitting both of the video signal and the audio signal in a wireless manner. Thus, the wireless communication portion 18 transmits both of the video signal and the audio signal, and a control signal as may be necessary to the wireless communication portion 24 of the display device 20. When the manipulation is carried out in the display device 20, the wireless communication portion 18 receives the control signal from the wireless communication portion 24 of the display device 20.

A communication made between the wireless communication portion 18 and the wireless communication portion 24 of the display device 20 can be made through a wireless High-definition Multimedia Interface (HDMI: registered trademark of HDMI Licensing, LLC), or Bluetooth (registered trademark of Bluetooth SIG Inc.). The wireless HDMI will be described later. The present disclosure is by no means limited to these communication standards as long as the wireless transmission of the video signal and audio signal can be carried out.

The reproduction from the disk medium, the adjustment of the sound volume, the taking-out of the disk medium or the like can be controlled by manipulating the manipulation portion 12 by the user. The manipulation portion 12 supplies a manipulation signal corresponding to the manipulation which has been carried out for the manipulation portion 12 by the user to the control portion 15. The control portion 15 supplies a control signal to the reproducing portion 14, the speaker 13, the disk drive 11, and the like, and carries out the control corresponding to the manipulation which has been carried out for the manipulation portion 12 by the user in accordance with the manipulation signal received thereat from the manipulation portion 12.

The electric power is supplied from a power source portion of the vehicle to the power source portion 16 which in turn supplies the electric power to the individual portions 11 to 18 of the in-vehicle reproducing device 10.

The electric power transmitting portion 17 transmits the electric power to the display device 20 through the non-contact electric power transmission. As far as the non-contact electric power transmission system concerned, specifically, it is possible to use a magnetic field resonance system, an electric field resonance system or the like. Although each of the magnetic field resonance system and the electric field resonance system is inferior in transmission efficiency to an electromagnetic induction system, each of the magnetic field resonance system and the electric field resonance system allows a transmission distance to fall within the wider range of several meters than that in the electromagnetic induction system. Therefore, each of the magnetic field resonance system and the electric field resonance system is suitable for the in-vehicle reproducing system 1 according to the first embodiment of the present disclosure in which it is expected that the display device 20 is used in a rear seat as well within a vehicle. In addition thereto, in the case of the wireless electric power transmission utilizing the magnetic field resonance system, only the specific resonance circuit can receives the electric power. Also, in the case of the wireless electric power transmission utilizing the electric field resonance system, only the specific dielectric material can receives the electric power. For this reason, for example, even when a metallic object is placed in the middle of an electric power transmission path, this situation is safe because the metallic object is not heated.

The electric power transmitting portion 17, for example, includes a resonance circuit composed of an LC circuit having a coil and a capacitor. An electric power receiving portion 23 of the display device 20 is also provided with the similar LC circuit. Thus, the magnetic field is resonated between both of the LC circuit of the electric power transmitting portion 17, and the LC circuit of the electric power receiving portion 23, thereby transmitting the electric power from the electric power transmitting portion 17 to the electric power receiving portion 23 in a wireless manner.

The control portion 15, for example, controls the disk drive 11, the reproducing portion 14, and the like in accordance with the manipulation carried out for the manipulation portion 12, thereby carrying out the reproduction control for the disk medium. Specifically, the control portion 15 can carry out start and stop of the reproduction, the adjustment of the sound volume, and the like. The control portion 15 controls the electric power transmission, and the transmission of the video signal, the audio signal, and the like by supplying the control signal to the electric power transmitting portion 17 and the wireless communication portion 18. When the control portion 15 receives the control signal corresponding to the manipulation which has been carried out for the display device 20 by the user, the control portion 15 carries out the reproduction control for the disk medium in accordance with the control signal thus received.

The display device 20, for example, is composed of the display portion 21, a touch panel type input portion (hereinafter referred to as "a touch panel") 21a provided on the display portion 21, the speaker 22, the electric power receiving portion 23, the wireless communication portion 24, a format converting portion 25, a control portion 26, and a battery portion 27.

The display portion 21, for example, is composed of a thin panel and a backlight. Also, the display portion 21 serves to output the video signal received from the in-vehicle reproducing device 10. The thin panel, for example, is a display section composed of a Liquid Crystal Display (LCD) device, an organic Electro Luminescence (EL) panel or the like. The image is displayed on the display portion 21 in accordance with the control made by the control portion 26.

In addition, the display portion 21 is provided with the touch panel 21a as an input unit on a front surface thereof. The display portion 21 and the touch panel 21a, for example, are stuck to each other through an adhesive agent. In addition, the touch panel 21a may be further provided with a front panel (not shown) as a surface member on a front surface thereof. The touch panel 21a and the front panel, for example, are stuck to each other through an adhesive agent.

The touch panel 21a, for example, is a touch panel utilizing either a resistance film system or an electrostatic capacitance system. The touch panel utilizing the resistance film system, for example, includes a touch panel utilizing a matrix resistance film system. Also, the touch panel utilizing the electrostatic capacitance system, for example, includes a projection type electrostatic capacitance touch panel utilizing either a Wire Sensor system or an ITO Grid system.

The reproduction and the like of the disk medium can be controlled by manipulating the touch panel 21a. The touch panel 21a is manipulated by the user, thereby making it possible to control the reproduction of the disk medium, the adjustment of the sound volume, and the like. The touch panel 21a supplies a signal corresponding to the manipulation for the touch panel 21a by the user to the control portion 26.

It is noted that the touch panel 21a is not an essential constituent element, and may not be provided when the manipulation in the display device 20 is unnecessary.

The speaker 22 serves to output the sound based on the audio signal received thereat from the in-vehicle reproducing device 10. In this case, the sound whose sound volume and the like have been adjusted in accordance with the control made by the control portion 26 is outputted from the speaker 22. The audio signal which has been received from the wireless communication portion 24 is supplied to the speaker 22 which in turn outputs the sound based on the audio signal.

The electric power receiving portion 23 has a configuration corresponding to the electric power transmitting portion 17 of the in-vehicle reproducing device 10, thereby receiving the electric power through the non-contact electric power transmission. The electric power receiving portion 23, for example, includes the LC circuit having a coil and a capacitor similarly to the case of the electric power transmitting portion 17. Thus, the magnetic field is resonated between both of the LC circuit of the electric power transmitting portion 17 and the LC circuit of the electric power receiving portion 23, thereby transmitting the electric power from the electric power transmitting portion 17 to the electric power receiving portion 23 in a wireless manner.

It is noted that although not illustrated, the electric power which has been transmitted from the in-vehicle reproducing device 10 is supplied as a power source from the electric power receiving portion 23 to the individual portions 21, 21a, 22, and 24 to 27 within the display device 20.

The wireless communication portion 24 can make a bidirectional communication with the wireless communication portion 18 of the in-vehicle reproducing device 10. The wireless communication portion 24 includes a wireless demodulating portion (not shown) for receiving the video signal and the audio signal in a wireless manner. Thus, the wireless communication portion 24 receives the video signal and the audio signal from the wireless communication portion 18 of the in-vehicle reproducing device 10. Likewise, the wireless communication portion 24 receives a control signal corresponding to the manipulation in the manipulation portion 12 from the in-vehicle reproducing device 10. When the manipulation is carried out in the touch panel 21a or the like of the display device 20, the wireless communication portion 24 transmits a control signal corresponding to the manipulation carried out in the touch panel 21a and supplied from the control portion 26 to the wireless communication portion 18 of the in-vehicle reproducing device 10. The wireless communication portion 24 is a communication portion having the communication system complying with the same standards as those in the wireless communication portion 18.

The format converting portion 25 converts the video signal received from the in-vehicle reproducing device 10 so as to follow the format in the display portion 21 of the display device 20. For example, the wireless communication portion 24 can receive a video signal about a non-compression High Definition (HD) image by the wireless HDMI or the like. For this reason, the format converting portion 25 converts the video signal so as to meet a size corresponding to the display portion 21 of the display device 20 having the small size.

The battery portion 27, for example, includes a secondary battery, a charge/discharge controlling circuit, and the like (each not shown). The battery portion 27, for example, may receive the electric power from the outside of the display device 20 by connecting an AC adapter or the like to the battery portion 27, thereby making it possible to charge the secondary battery with the electricity. The battery portion 27 can supply the electric power to the individual portions 21 to 26 of the display device 20 in accordance with the control made by the control portion 26. The battery portion 27 may be provided with an electric charge storing portion such as a capacitor instead of being provided with the secondary battery.

It is noted that it is only necessary to provide the battery portion 27 as may be necessary, and when no battery portion 27 is provided, the display device 20 can be further thinned and lightened.

The control portion 26, for example, causes the display portion 21 to display thereon the image based on the video signal received in the wireless communication portion 24 in accordance with the control signal received in the wireless communication portion 24. When the audio signal is received in the wireless communication portion 24, the control portion 26 causes the speaker 22 to output the sound based on the audio signal. Also, when the user has manipulated the touch panel 21a, the control portion 26 transmits the control signal corresponding to the manipulation signal supplied thereto from the touch panel 21a to the in-vehicle reproducing device 10 through the wireless communication portion 24.

In addition, the control portion 26 monitors the electric power transmission state in the electric power receiving portion 23. Thus, when the supply of the electric power from the in-vehicle reproducing device 10 through the non-contact electric power transmission has been interrupted, the control portion 26 controls the battery portion 27 in such a way that the electric power is supplied from the battery portion 27.

Hereinafter, the wireless HDMI as an example of the wireless communication system will be described in detail. The wireless HDMI is such that in the HDMI with which heretofore, the video signal and the audio signal have been transmitted through the cable, the video signal and the audio signal are transmitted in a wireless manner instead. As for the technique for wirelessly transmitting the HD image in a non-compression style, for example it is possible to use a Wireless Home Digital Interface (WHDI) or a Wireless High Definition (Wireless HD).

The HDMI is a digital interface through which a base-band signal containing therein a video signal about a moving image to be reproduced, and an audio signal accompanying the video signal is transmitted at a high speed. The standards of the HDMI are the standards which are arranged for an Audio Visual (AV) apparatus by adding the sound transmitting function and the copyright protection function to a Digital Visual Interface (DVI) as the connection standard specification for a Personal Computer (PC) and a display device.

A device connected through the HDMI includes an HDMI Source and an HDMI Sink. The HDMI source includes an output portion for outputting a video signal and an audio signal through the HDMI. Also, the HDMI sink includes an input portion for receiving as an input thereof a video signal and an audio signal through the HDMI.

The HDMI has a signal channel through which a video signal and an audio signal in a base-band are transmitted in the direction from the HDMI source to the HDMI sink. The HDMI has a Consumer Electronics Control (CEC) line as a control channel through which a control signal (message) utilized for the control for the MDMI source and the HDMI sink is bidirectionally transmitted. The control systems are mutually controlled through the CEC line.

For example, in the in-vehicle reproducing system 1 according to the first embodiment of the present disclosure, the in-vehicle reproducing device 10 has the function as the HDMI source, the display device 20 has the function as the HDMI sink, and the in-vehicle reproducing device 10 and the display device 20 are connected to each other through the wireless HDMI. Also, the wireless communication portion 18 of the in-vehicle reproducing device 10 has the function as the output portion of the HDMI source, and the wireless communication portion 24 of the display device 20 has the function as the input portion of the HDMI sink, thereby making the communication through the wireless HDMI. The in-vehicle reproducing device 10 and the display device 20 composing the in-vehicle reproducing system 1 correspond to the CEC, and the operation is carried out in accordance with the manipulation in any one of the in-vehicle reproducing device 10 and the display device 20.

2. Modified Change

It is noted that the in-vehicle reproducing system 1 described above may have a function as the navigation system in addition to the function as the reproducing device. For example, the in-vehicle reproducing device 10 includes a Global Positioning System (GPS). Also, on the in-vehicle reproducing device 10 side, a navigation image is obtained through the synthesis by superimposing a map image the data on which is previously stored and a guide path up to a destination. Also, a video signal about the navigation image is wirelessly transmitted to the display device 20 and the display portion 21 is caused to display thereon the navigation image. In addition, on the in-vehicle reproducing device 10 side, an audio signal about a navigation sound which is outputted when a current position of a vehicle overlaps a suitable position on the guide path up to the destination is supplied to the speaker 13 to be outputted from the speaker 13 or is wirelessly transmitted to the display device 20 to be outputted from the speaker 22.

The display device 20 side may have such a navigation function. That is to say, the display device 20 may include the GPS, may cause the display portion 21 to display thereon the navigation image obtained through the synthesis based on the map image the data on which is previously stored in the display device 20, and may cause the speaker 22 to output the navigation sound. In this case, the display device 20 includes the battery portion 27, whereby only the display device 20 can be taken out of the vehicle to be used as a portable navigation system.

3. Configuration of Display Device

The display device 20 according to a second embodiment of the present disclosure includes the display portion 21, the touch panel 21a, the speaker 22, the electric power receiving portion 23, the wireless communication portion 24, the format converting portion 25, the control portion 26, and the battery portion 27 which are all described above with reference to FIG. 3. In this case, of these portions, in particular, the display portion 21 displays thereon the image based on the video signal received in the wireless communication portion 24. The electric power receiving portion 23 receives the electric power transmitted thereto from the in-vehicle reproducing device 10 fixed to the vehicle through the non-contact electric power transmission. Also, the wireless communication portion 24 receives the video signal from the in-vehicle reproducing device 10.

<Effects>

In the in-vehicle reproducing system 1 according to the first embodiment of the present disclosure, when the user gets out of the vehicle, with the aim of the security, the display device 20 can be detached from the in-vehicle reproducing device 10 to be taken out of the vehicle. Also, since it is unnecessary to connect the in-vehicle reproducing device 10 and the display device 20 by using the connector when the display device 20 is fitted into the in-vehicle reproducing device 10 to be used, it is possible to lighten and thin the display device 20.

Figure 4:
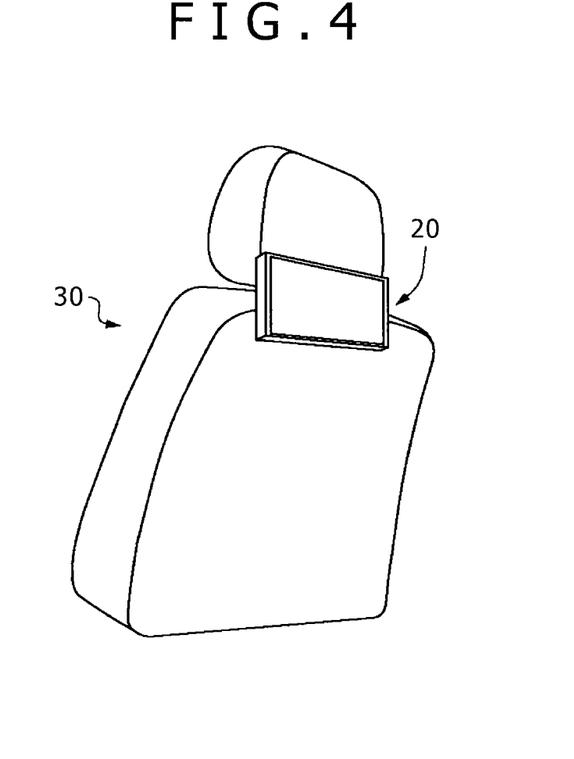
FIG. 4 is a schematic perspective view showing the case where the display device in the in-vehicle reproducing system according to the first embodiment of the present disclosure is detached from the in-vehicle reproducing device to be used.

In addition, in the in-vehicle reproducing system 1 according to the first embodiment of the present disclosure, the display device 20 can be used even in a position distant from the in-vehicle reproducing device 10 without requiring a special wiring or the like. For example, the user who sits on the rear seat holds the display device 20 with his/her head, or as shown in FIG. 4, the display device 20 is fixed to a back surface of a seat 30, and in this state, the user can view the image displayed on the display portion 21 of the display device 20.

In addition thereto, it is unnecessary to dispose connector pins in the in-vehicle reproducing device 10 and the display device 20, respectively. Therefore, the commercial product development becomes possible in which the in-vehicle reproducing device 10 is subjected to the common design, and thus the design of the display device 20 is given the variation.

Although the embodiments of the present disclosure have been concretely described so far, the present disclosure is by no means limited to the embodiments described above, and thus various kinds of changes based on the technical idea of the present disclosure can be made.

It is noted that the present disclosure can also adopt the following constituents.

(1) An in-vehicle reproducing system including:
a reproducing device; and
a display device detachably mounted to the reproducing device, wherein
the reproducing device is fixed to a vehicle and includes
a reproducing portion obtaining at least a video signal from an attachable storage medium,
a manipulation portion carrying out control for reproduction for the attachable storage medium,
a first wireless communication portion transmitting the video signal to the display device, and
an electric power transmitting portion transmitting an electric power to said display device through non-contact electric power transmission, and
the display device includes
an electric power receiving portion receiving the electric power transmitted thereto from the reproducing device through the non-contact electric power transmission,
a second wireless communication portion receiving the video signal from the reproducing device, and
a display portion displaying thereon an image based on the video signal received in the second wireless communication portion.

(2) The in-vehicle reproducing system described in the paragraph (1), wherein a touch panel type input portion is provided on a surface of the display portion of the display device.

(3) The in-vehicle reproducing system described in one of the paragraphs (1) and (2), wherein a control signal corresponding to a manipulation carried out in the touch panel type input portion is transmitted from the second communication portion to the first communication portion, and
the reproducing device controls the reproduction from the storage medium.

(4) The in-vehicle reproducing system described in any one of the paragraphs (1) to (3), wherein, when the transmission of the electric power is not carried out between the reproducing device and the display device through the non-contact electric power transmission, an electric charge storing portion supplies the electric power to the display device.

(5) A display device including:
an electric power receiving portion receiving an electric power transmitted thereto from a reproducing device fixed to a vehicle through non-contact electric power transmission;
a wireless communication portion receiving a video signal from the reproducing device; and
a display portion displaying thereon an image based on the video signal received in the wireless communication portion.

(6) The display device described in the paragraph (5), wherein a touch panel type input portion is provided on a surface of the display portion of the display device.

(7) The display device described in the paragraph (6), wherein a control signal corresponding to a manipulation carried out in the touch panel type input portion is transmitted from the wireless communication portion to the reproducing device.

(8) The display device described in any one of the paragraphs (5) to (7), wherein when the transmission of the electric power is not carried out to the electric power receiving portion through the non-contact electric power transmission, an electric charge storing portion supplies the electric power.

The present disclosure contains subject matter related to that disclosed in Japanese Priority Patent Application JP 2011-258918 filed in the Japan Patent Office on Nov. 28, 2011, the entire content of which is hereby incorporated by reference.

What is claimed is:

1. An in-vehicle reproducing system, comprising:
a reproducing device; and
a display device configured to be detachably mounted to said reproducing device, wherein
said reproducing device is fixed to a vehicle and includes:
circuitry configured to:
obtain at least a video signal from an attachable storage medium,
carry out control for reproduction of content contained on said attachable storage medium,
transmit the video signal to said display device, and
an electric power transmitting portion configured to transmit an electric power to said display device through non-contact electric power transmission, and
said display device includes:
an electric power receiving portion configured to receive the electric power transmitted thereto from said reproducing device through the non-contact electric power transmission,
circuitry configured to receive the video signal from said reproducing device, and display thereon an image based on the video signal received from said reproducing device, and
an electric charge storing portion,
wherein, when the transmission of the electric power is interrupted between the reproducing device and the display device through the non-contact electric power transmission, the electric charge storing portion supplies the electric power to the display device.

2. The in-vehicle reproducing system according to claim 1, wherein a touch panel type input portion is provided on a surface of a display portion of said display device.

3. The in-vehicle reproducing system according to claim 2, wherein a control signal corresponding to a manipulation carried out in said touch panel type input portion is transmitted from a second communication portion of the display device to a first communication portion of the reproducing device; and
said reproducing device controls the reproduction from the storage medium.

4. A display device, comprising:
an electric power receiving portion configured to receive an electric power transmitted thereto from a reproducing device fixed to a vehicle through non-contact electric power transmission;
circuitry configured to receive a video signal from said reproducing device;
a display portion configured to display thereon an image based on the video signal received from said reproducing device; and
an electric charge storing portion,
wherein, when the transmission of the electric power is interrupted to the electric power receiving portion through the non-contact electric power transmission, the electric charge storing portion supplies the electric power.

5. The display device according to claim 4, wherein a touch panel type input portion is provided on a surface of said display portion of said display device.

6. The display device according to claim 5, wherein a control signal corresponding to a manipulation carried out in said touch panel type input portion is transmitted from a wireless communication portion of the display device to said reproducing device.

* * * * *